(12) United States Patent
Hofmann

(10) Patent No.: US 7,392,886 B2
(45) Date of Patent: Jul. 1, 2008

(54) CLAMPING AND/OR BRAKE DEVICE

(76) Inventor: Klaus Hofmann, Birkenweg 10, 85567, Pienzanau (DE)

( * ) Notice: Subject to any disclaimer, the term of this patent is extended or adjusted under 35 U.S.C. 154(b) by 198 days.

(21) Appl. No.: 10/542,812

(22) PCT Filed: Nov. 18, 2003

(86) PCT No.: PCT/DE03/03802

§ 371 (c)(1),
(2), (4) Date: Jul. 20, 2005

(87) PCT Pub. No.: WO2004/067222

PCT Pub. Date: Aug. 12, 2004

(65) Prior Publication Data

US 2006/0042892 A1    Mar. 2, 2006

(30) Foreign Application Priority Data

Jan. 20, 2003  (DE) ............................. 103 02 225
May 5, 2003   (DE) ............................. 203 06 924 U

(51) Int. Cl.
*B66D 5/26* (2006.01)
*F16D 49/12* (2006.01)

(52) U.S. Cl. ..................... 188/151 R; 188/67

(58) Field of Classification Search .............. 188/43, 188/151 R, 67; 279/2.06, 2.07, 2.08, 2.09, 279/4.01, 4.03, 4.04, 4.05
See application file for complete search history.

(56) References Cited

U.S. PATENT DOCUMENTS 3,422,505 A * 1/1969 Slemmons .................... 188/67

(Continued)

FOREIGN PATENT DOCUMENTS

WO    WO 01/34990 A1    5/2001

*Primary Examiner*—Thomas J Williams
(74) *Attorney, Agent, or Firm*—The Culbertson Group, P.C.

(57) ABSTRACT

The invention relates to a clamping and/or braking device with a base element (7) and a force-applying element (17), by means of which the generated clamping and/or braking forces can be transferred to an object (39), as well as at least two adjacent wall sections (3), which each apply force with an end region on the base element (7) and the force-applying element (17), and wherein the two or more adjacent wall sections (3) define an essentially sealed pressure chamber that can be pressurized with pressure or negative pressure, wherein the two or more wall sections (3) each have a bending region (3a), which is resistant to tensile force and nevertheless can be bent elastically so that the bending regions (3a) form an elastic element between the base element (7) and the force-applying element (17).

By means of the force-applying element (17), in the unpressurized built-in state of the clamping and/or braking device (1), a predetermined clamping and/or braking force can be exerted on the object (39), wherein the two or more wall sections (3) and their bending regions (3a) are formed, such that when the pressure chamber is pressurized with positive pressure or negative pressure as a result of a change in the curvature of the bending regions (3a), the clamping and/or braking forces transferred by the force-applying element (17) to the object (39) are changed or the force-applying element (17) is moved in the direction towards the base element (7) or away from this element.

According to one alternative, the two more adjacent wall sections (3) can also be connected rigidly to the force-applying element (17) and/or to the base element (7).

14 Claims, 10 Drawing Sheets

U.S. PATENT DOCUMENTS

| | | | |
|---|---|---|---|
| 3,507,507 A | * 4/1970 | Cochon et al. | 279/2.08 |
| 3,626,506 A | * 12/1971 | Spieth | 279/2.01 |
| 3,663,027 A | 5/1972 | Klipping | |
| 4,543,877 A | 10/1985 | Emmert | |
| 4,638,724 A | * 1/1987 | Emmert | 92/84 |
| 6,629,584 B1 | * 10/2003 | Muller | 188/43 |

* cited by examiner

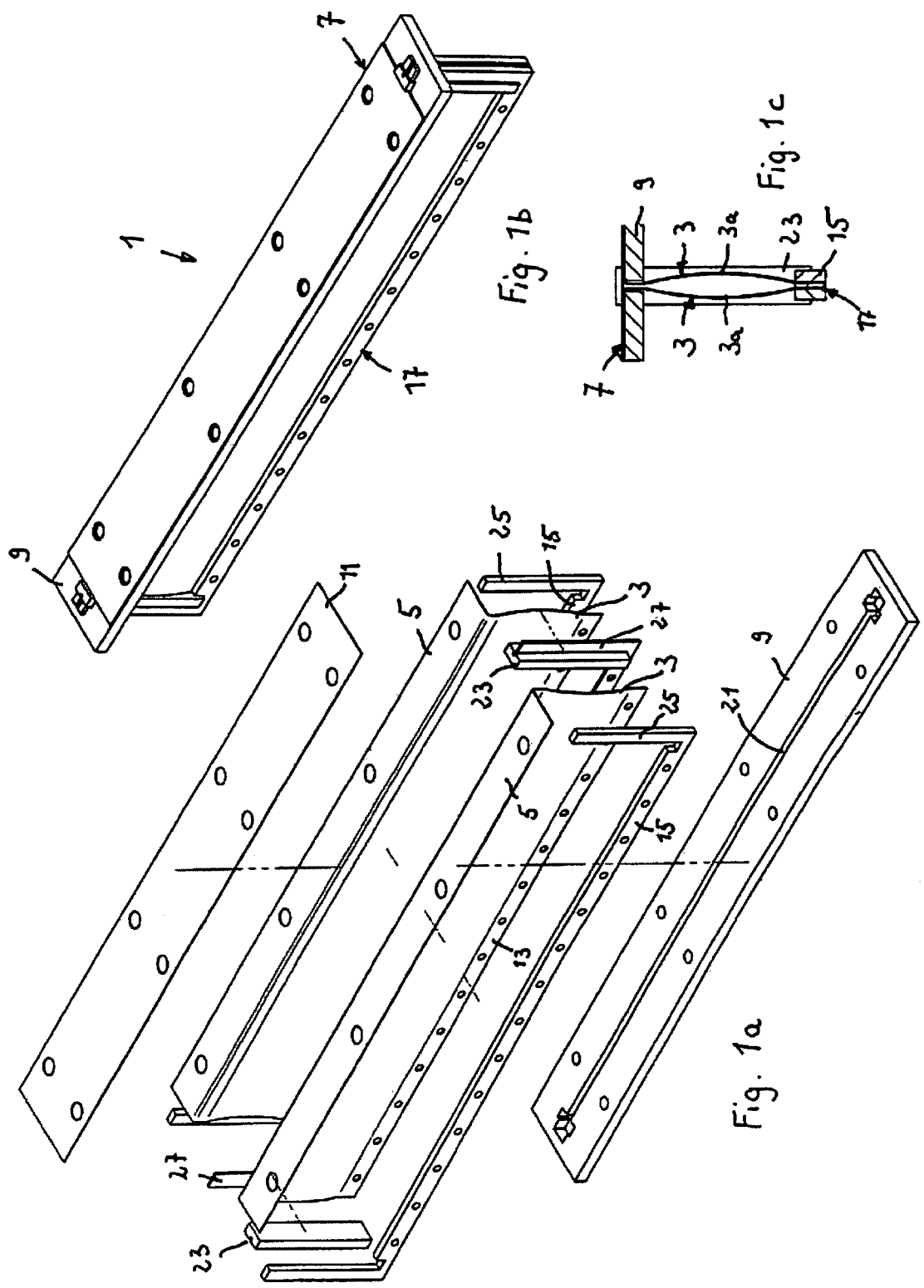

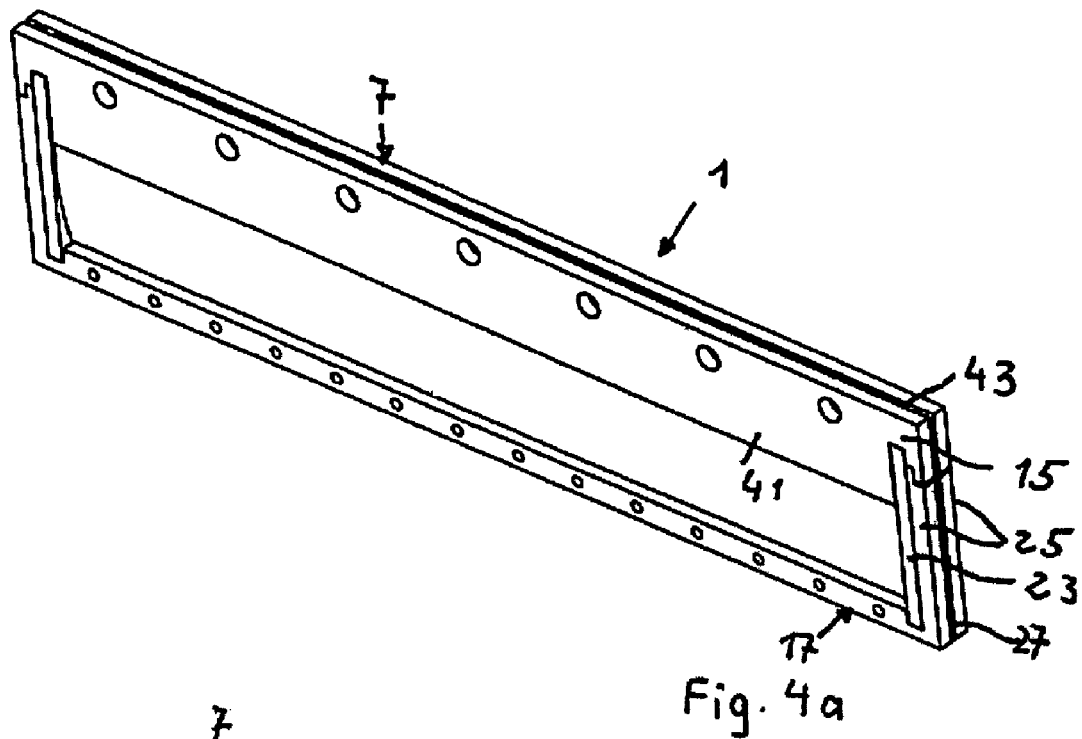
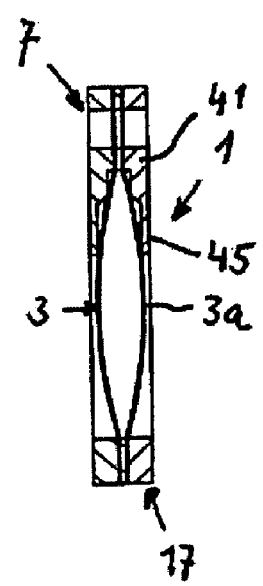

CLAMPING AND/OR BRAKE DEVICE

CROSS-REFERENCE TO RELATED APPLICATION

The Applicant claims the benefit of PCT International Application No. PCT/DE03/03802, filed Nov. 18, 2003, entitled CLAMPING AND/OR BRAKING DEVICE, which claims the benefit of German Patent Application No. 103 02 225.2 filed Jan. 20, 2003 and German Utility Model Application No. 203 06 924.2 filed May 5, 2003.

TECHNICAL FIELD OF THE INVENTION

The invention relates to a clamping and/or braking device in which a sealed pressure chamber is used between a base element and a force-applying element to control a clamping and/or braking force transferred by the force-applying element.

BACKGROUND OF THE INVENTION

Clamping or braking devices are known in a wide variety of embodiments for a wide variety of applications. Thus, in EP-A-0 936 366, a braking device for a linear guide is known, which has a carrier body, which can move along a guide rail. The carrier body has brake shoes, which act on the two longitudinal sides. The carrier body has an H shape and a thin, flexible connecting piece and two lower limbs, with which it grips around the guide rail. A brake shoe is arranged between each lower limb and the guide rail. The carrier body is provided with two upper limbs, which, together with the connecting piece, form a receptacle space, in which a force-generating means acting on the upper limbs is provided. Here, the force-generating means can be a toggle lever mechanism that can be activated hydraulically or pneumatically or a piezo-actuator. In addition, a tapered slide valve used as a force transducer can be provided, can be activated hydraulically or pneumatically, and is guided in a space becoming narrower in the longitudinal direction of the braking device between the upper limbs of the carrier body. In all cases, the elastic connecting piece bends due to the application of force on the two upper limbs, so that the two lower limbs with the brake shoes are moved inwards or a greater force is applied to the guide rail.

A disadvantage in this known braking device in connection with the use of an electromechanical transducer, for example, a piezoelement, is particularly its sensitivity to vibrations or other mechanical loads.

The use of a toggle lever mechanism or a tapered slide valve, as well as an electromechanical transducer, means high assembly or manufacturing expense.

In addition, particularly for clamping devices, there is the requirement for sufficiently high clamping forces, which can be realized in known devices only with a relatively high structural and thus financial expense.

From U.S. Pat. No. 5,855,446, a hydraulic clamping sleeve is known, which is aligned on a shaft and can be connected to it, e.g., locked in rotation. The sleeve has an essentially stable sleeve body, which is arranged around a drive shaft at a distance. A pressurized chamber abuts this sleeve body and faces the shaft. A side wall of this chamber, which extends essentially parallel to the shaft, is used here simultaneously as a braking element, which is pressed against the shaft by the expansion of the chamber when the chamber is pressurized, in order to establish a frictionally engaged connection. A Σ-shaped formation of the laterally adjacent walls of the chamber is intended to prevent the sleeve from becoming misaligned relative to the shaft when the chamber is pressurized. In the pressurized state, the Σ-shaped side walls enable expansion of these side walls in the radial direction towards the shaft, even before the increasing chamber pressure also presses the chamber wall running parallel to the shaft against the shaft. Thus, the sleeve can be aligned perpendicular to the shaft axis before the rotationally fixed connection is generated.

This clamping device does not exhibit satisfactory force transfer for generating high contact forces. Furthermore, the chamber is limited in its shape and especially in its possible placement relative to the sleeve body. Braking action can be achieved here only by pressurizing with positive pressure, and the actual brake element, which must possibly transfer high driving forces, is not connected rigidly to the sleeve body, but instead only via the forced relatively unstable pressure chamber.

From WO 01/34990 A1 by the applicant, a clamping and/or braking device is known, in which a base is provided with a chamber, which can be pressurized and which is limited at least in one part of at least one wall section that is flexible but resistant to tensile force and pressure. The limit of the chamber opposite the wall section can also be formed like the first wall section. However, it can also be a rigid part of a body. Preferably, the wall sections lie at a relatively small distance from each other. The forces resulting from the deformation of the chamber are guided at least partially in the direction towards or along the wall section and introduced into a base in the region of the connection of the wall section to this base. If the application point of such points on the base is selected appropriately, and if this base is at least partially elastically deformable, then the forces can be transferred via this base to other points of the base, e.g., in clamping or braking regions. A corresponding braking or clamping means in these regions can then be moved by means of forces into a pressurized position or from this position in order to brake or release a guide element or an element to be clamped or braked. In this way, the application of both positive pressure and also negative pressure in the chamber can be used in order to introduce both tensile and also compressive forces into the base. Obviously, the clamping and/or braking regions can still be engaged with the guide element or the element to be clamped or braked before and after the force introduction, wherein, however, this generates changes in the pressurizing forces between the clamping and/or braking regions and the corresponding other element.

This known clamping and/or braking device starts from the knowledge that when a suitable chamber is pressurized with negative pressure or positive pressure, it tends to deform. If this chamber is formed to a large part from at least one approximately flat wall section, then positive pressure or negative pressure in the chamber first causes deformation in a first direction, which runs essentially perpendicular to this wall section. In order to yield to the deformation (expansion or contraction) in this first direction, this deformation generates contraction or expansion of the chamber accordingly and respectively in a second direction generally perpendicular to the first direction (thus essentially parallel to the wall section). In this way, the fact is used that small forces or deformations in the first direction generate large forces in the second direction, which can be used for braking or clamping or for loosening biased clamping or braking devices.

Finally, from DE 28 48 651 A1, a contracting cell is known, which enables the generation of a linear movement path with a corresponding tensile force in a wide variety of embodiments. The contracting cell can also comprise two spring plates, for example, steel plates, in one embodiment, with a compression chamber, which can be sealed, for example, by means of a bellows, being defined between the plates. By pressurizing the bellows with compressed air, the spring steel plates are bent, so that the lower ends of the two steel plates move in the direction towards the corresponding upper ends. However, at no point does this publication describe the generation of braking and/or clamping forces by means of such a contracting cell.

Starting from the state of the art named above, the invention is based on the problem of designing a clamping and/or braking device, which can be produced with low construction expense and with which sufficiently high braking or clamping forces can be generated in a simple way.

SUMMARY OF THE INVENTION

The invention starts from the knowledge that by means of two wall sections, which are arranged between a base element and a force-applying element and which connect these elements, a space that can be pressurized can be defined, wherein the two wall sections each have a bending region, which is formed so that it is resistant to tensile force and nevertheless can be bent elastically such that the bending regions between the base element and the force-applying element form a spring element. The two wall sections and their bending regions are shaped so that when the compression chamber is pressurized with positive pressure or negative pressure as a result of a change in the curvature of the bending regions, a change in the clamping and/or braking forces transferred by the force-applying element to the object is produced or a movement of the force-applying element in the direction towards the base element or away from this element is achieved. The base element and the force-applying element do not absolutely have to be connected to the wall sections. Instead, the wall sections can each apply force to the base element and the force-applying element with their end regions.

In these embodiments, different from the known device by the applicant, it is possible to generate or to change clamping and/or braking forces without requiring deformation of an essentially rigid body. In this way, in addition to simple construction, a small overall size is produced.

The device can be manufactured easily, because the force-applying element has to be connected to the base element merely via two wall sections. Obviously, the lateral regions of the wall sections must also be sealed essentially pressure-tight (if necessary, a small leakage can be tolerated, e.g., if compressed air is used as the pressure medium).

Different from the known clamping sleeves, which have relatively soft wall sections and which merely enlarge the distance between the force-applying element and the base element when pressurized by means of positive pressure, the device according to the invention can also be formed and used, such that when pressurized (with positive pressure or negative pressure), the distance between the base element and the force-applying element is reduced. With the device according to the invention, it is possible to generate a predefined clamping and/or braking force, with which the force-applying element is pressurized with an element interacting for this purpose, even in the unpressurized state for a corresponding assembly of the device in an overall device. By pressurizing with positive pressure or negative pressure, the forces transferred to this object can be increased, reduced, or completely canceled.

Here, the wall sections can be formed with the presence of a corresponding curvature so that depending on a negative pressure or positive pressure, the distance between the base element and the force-applying element increases or decreases or the generated forces increase or decrease.

According to one embodiment of the invention, the bending regions of the two wall sections run essentially parallel in the unpressurized state and preferably at a small distance, which can lie, for example, in the range from 0.1 mm to 10 mm, preferably from 1 mm to 5 mm.

In this embodiment, both for the pressurization of the pressure chamber between the wall sections with positive pressure and also for the pressurization with negative pressure, by increasing the curvature, the distance between the base element and the force-applying element is decreased or the forces that can be transferred are reduced.

In the original state, the wall sections can have a slight curvature, so that the bending regions obtain a preferred direction. In this way, for an activation of the spring formed by the wall sections, the bending regions of the wall sections bulge in the desired direction. For example, in the unpressurized state, the bending regions can be bent outwards slightly convex opposite the pressure chamber defined by these wall sections. If the clamping and/or braking device is installed in an overall device, such that in the unpressurized original state forces are already transferred to the object to be pressurized, then the bending regions of the wall sections are bent farther in the predetermined direction as a result of the compression of the spring-like element formed by these wall sections. Then, for pressurization with positive pressure, the curvature increases again and the transferred forces are reduced or completely canceled.

In the same way, a device formed and assembled in this way can obviously also be pressurized with negative pressure, wherein the curvature of the bending regions are further reduced and thus the forces that can be transferred are increased. The maximum pressure is therefore predetermined such that the wall sections may not be moved past total parallelism with each other, because otherwise the bending would reverse from outwardly convex to inwardly convex. However, the curvature in the unpressurized state can also be predetermined inwardly convex relative to the pressure chamber. The behavior of this device when pressurized with positive pressure or negative pressure is analogous.

As previously stated, if the forces that can be transferred increase or the distance between the force-applying element and the base element increase, then for such embodiments in the unpressurized original state, the curvature of the walls or of the bending regions must obviously be shaped such that it can be reduced when pressurized with positive pressure or negative pressure.

In order to be able to already transfer large forces in the original state, it is advantageous to form the bending regions of the wall sections such that the curvatures follow mathematically smooth functions and therefore have no sharp breaks.

According to one embodiment of the invention, the wall sections can be formed as separate parts and can have an attachment region, with which the wall sections are connected, preferably pressure-tight, to the base element, or the wall sections formed as separate parts can be shaped in their attachment regions, such that these form the base part according to the preferably pressure-tight connection to each other.

The wall sections can each have an attachment region bent at a right angle in the region of the base element, wherein the attachment regions are connected preferably pressure-tight to a base element running essentially perpendicular to the bending regions. In this case, the base element can be formed as a mounting plate.

In the same way, the wall sections can be formed as separate parts and can have an attachment region, with which the wall sections, preferably pressure-tight, are connected to the force-applying element. In turn, the attachment regions can be shaped so that they form the force-applying element after the preferably pressure-tight connection to each other.

According to one embodiment of the invention, the side regions of the wall sections can be sealed by means of side sealing elements, which contact flush to these sections and which can consist preferably of plastic or rubber. For changes of curvature in the bending regions of the wall sections, these wall sections slide flush on the affected surface of the sealing element. For a corresponding contact pressure, however, a sufficient seal can be achieved.

However, obviously in the side regions, sealing elements can also be provided between the wall sections, for example, glued in place, wherein these sealing elements are formed to be flexible, such that these join in with the movements of the wall sections, without losing their sealing effect, when the curvature of the bending regions of the wall sections changes.

Between the wall sections formed as separate parts, in the region of the base element and/or the force-applying element, a spacing and/or sealing element can be inserted. This enables, for one, the sealing of the appropriate edges or side regions of the wall sections and, second, a defined volume of the pressure chamber formed between the wall sections in the unpressurized original state.

However, it is also possible to connect the wall sections to each other directly in these regions, without placing such an element in-between. The defined volume in the original state can then be defined by bending regions of the wall sections bent outwardly convex.

According to one embodiment of the invention, projecting from the base element or force-applying element, a retaining arm for the appropriate side sealing element extends in the direction towards the corresponding other element (force-applying element or base element), wherein the side sealing element is preferably arranged between the side end surfaces of the wall sections and the retaining arm. The sealing element can have a certain flexibility and the distance between the side end wall sections and the retaining arm can be dimensioned, so that the sealing element is pressed with a predetermined contact force against the side end surfaces.

According to one embodiment of the invention, the movement path of the bending movement of the bending regions of the wall sections can be limited by a mechanical stop when pressurized, wherein the stop is preferably connected to the base element. Thus, the stop can be formed to be stable and, if necessary, to cover the complete bending regions, so that destruction of the device can be prevented even if the given maximum pressure is exceeded or so that there is no danger to persons or objects in the vicinity if the device is actually destroyed.

According to another embodiment of the invention, several force-applying elements can each be connected by means of two wall sections to a base element. At this point it should be mentioned that the connection of the base element and the force-applying element each by means of several pairs of wall sections is obviously also possible, which each define a space that can be pressurized.

In the case of several force-applying elements arranged on a base element, in a special embodiment, the base element can be formed with a ring shape, preferably with a circular ring shape.

In this way, it is possible, for example, to clamp or to brake a bar-shaped element with several force-applying elements around its outer periphery. Obviously, the force-applying elements can also be formed extending outwards in the radial direction from the ring-shaped base element, so that in this way, a clamping or braking effect can be generated by a clamping and/or braking device arranged within a tubular element, as is the case, for example, in a drum brake.

The pairs of wall sections or the force-applying elements can preferably be arranged in a plane and closely adjacent to each other.

Such a device according to the invention can be manufactured, for example, such that the pairs of wall sections are formed by two wall elements, which are formed as ring-shaped, preferably as radially slotted plates. In such an embodiment, the wall regions between the slots form the bending regions, at whose end an attachment region is provided, which is connected to the corresponding force-applying element or forms this element. The joining region of the wall elements (in the peripheral direction) forms another attachment region, which is connected to the base element or forms this element.

The seal between the wall sections can be realized in that two ring-shaped sealing elements, which form a common pressure chamber for the pairs of wall sections, are provided between the separately formed wall elements, wherein the sealing elements are preferably held in a sealing manner between the attachment regions of the wall elements.

However, in the bending regions of the wall elements, instead of two separate ring-shaped sealing elements, a tubular ring element can also be provided, which forms the common pressure chamber for the pairs of wall sections.

Instead of connecting or providing a separate force-applying element to each wall pair, a single ring-shaped, preferably slotted force-applying element can also be pressurized by the end regions of the wall pairs.

The base can be formed as an essentially closed, preferably two-part housing, in which the wall elements are received, wherein preferably inner wall sections of the housing limit a maximum bending of the bending regions of the wall sections.

Also, the ring-shaped, preferably slotted force-applying element can be held in the housing and guided relative to its radial dimensional changes.

In another embodiment, the base element and the force-applying element can be connected to each other and formed as a one-piece base with a clamping and/or braking region, wherein the two or more wall sections act on the base with their end regions in the unpressurized state, so that through an elastic deformation of the base by means of the clamping and/or braking region, a change of the clamping and/or braking forces that can be transferred to the object by the force-applying element is caused or a movement of the force-applying element in the direction towards the base element or away from this element is realized. Through the biasing forces exerted on the base by the wall sections in the unpressurized state, it is also possible, without a tight connection of the wall sections to the base, to create a device which is deformed elastically when the pressure chamber between the wall sections is pressurized, so that the regions of the base pressured by the end regions of the wall sections move in the direction towards their unbiased original position. Here, the clamping and/or braking regions are provided on the base, so that when pressurized, either loosening (or a reduction of the clamping or braking forces) or clamping (or an increase of the clamping or braking forces) is produced.

The base (59) can be formed with essentially an H shape, wherein the clamping and/or braking regions are provided on the essentially parallel limbs of the base on one side of the center connecting piece of the base and wherein the wall sections are provided between the parallel limbs of the base on the other side of the center connecting piece of the base and apply force on these, wherein the base can be deformed elastically in the region of the center connecting piece or the connection regions of the center connecting piece with the limbs.

According to another embodiment, the base (59) can be formed in an essentially U shape, wherein the clamping and/or braking regions are provided on the essentially parallel limbs of the base and wherein the wall sections are provided between the parallel limbs of the base and apply force to these limbs, wherein the base can be deformed elastically in the region of the base of the U and/or the limbs of the U-shaped base.

These and other advantages and features of the invention will be apparent from the following description of the preferred embodiments considered along with the accompanying drawings.

BRIEF DESCRIPTION OF THE DRAWINGS

FIG. 1a is a perspective exploded view of a first embodiment of a clamping and/or braking device embodying the principles of the invention.

FIG. 1b is a perspective view of the device shown in FIG. 1a, but with the device completely assembled.

FIG. 1c is view in transverse cross section of the device shown in FIG. 1b.

FIG. 2a is a perspective view of a linear guide with clamping and/or braking device arranged therein according to FIG. 1a.

FIG. 2b is a view in transverse cross section through the linear guide shown in FIG. 2a.

FIG. 4a is a perspective view of another embodiment of a clamping and/or braking device according to the present invention.

FIG. 4b is a view in transverse cross section through the device shown in FIG. 4a.

DESCRIPTION OF PREFERRED EMBODIMENTS

Figures 2A, 2B:
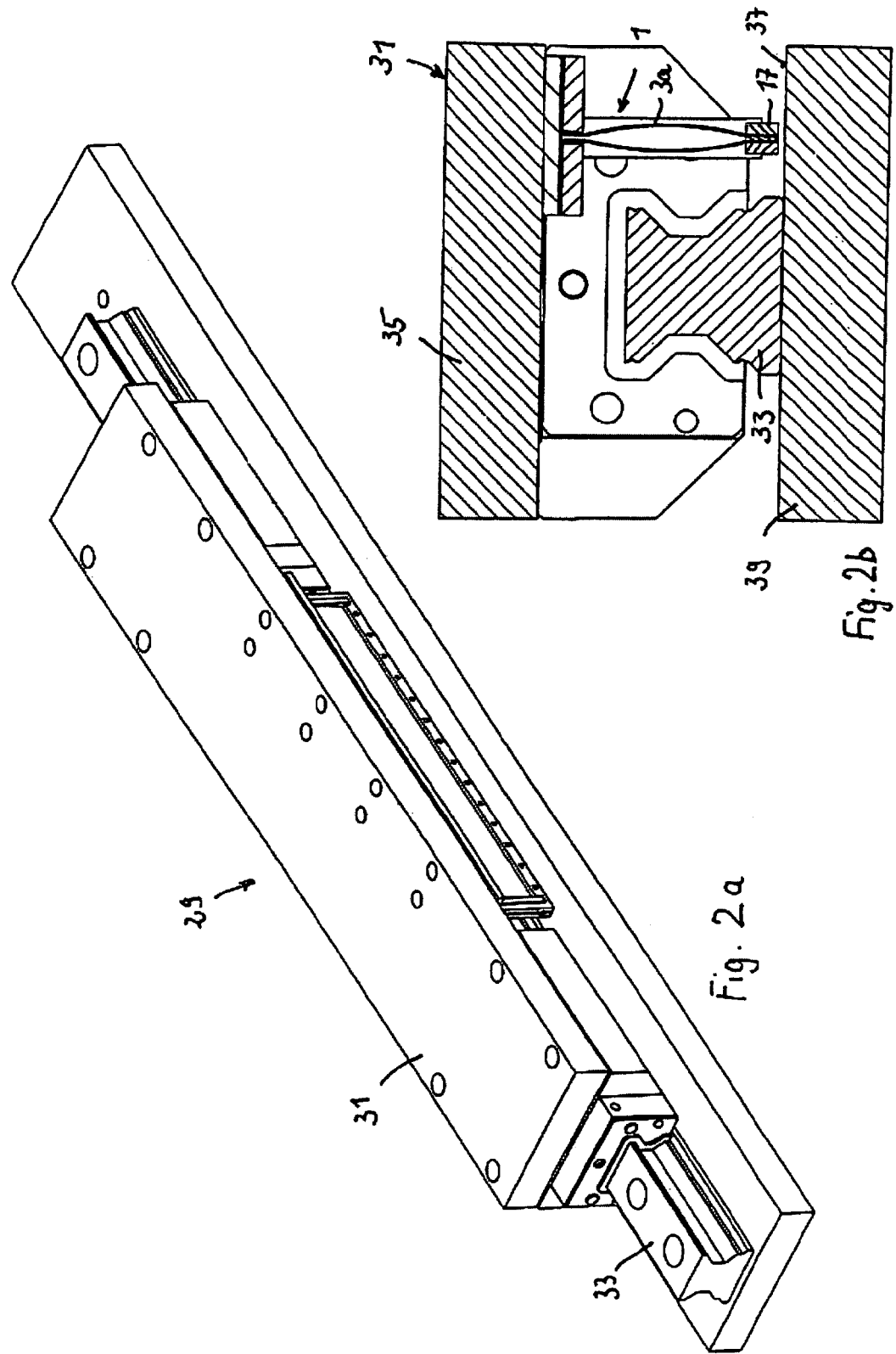

The clamping and/or braking device 1 shown in FIGS. 1a, 1b, and 1c comprises, as can be seen from the exploded view from FIG. 1a, two separate wall sections or wall elements 3, which are bent at a right angle to the remaining profile of the wall sections at one end (upper region). In the assembled state, these attachment regions 5 are connected to a base element 7, which is formed by a retaining plate 9 and a sealing plate 11. In the lower region, the wall sections or the wall elements 3 each have another attachment region 13, which in the assembled state is held between two assembly parts 15 of a force-applying element 17. Between the attachment regions 13, a spacing and/or sealing element 19 is held, which has essentially the same length and the same height as the assembly parts 15 of the force-applying element 17. The connection of the assembly parts 15 to the attachment regions 13 of the wall elements 3 and the spacing and/or sealing element 19 can be realized, for example, through screws, welds, adhesives, or solder.

The connection is here realized preferably such that a pressure-tight connection is produced along the connection line.

The assembly of the device can be realized such that first the wall elements 3 are inserted through a central longitudinal slot 21 of the retaining plate 9 until the bent attachment regions 5 contact the surface of the retaining plate 9. Then, the spacing and/or sealing element 19 can be inserted between the attachment regions 13 of the wall elements 3. The force-applying element 17 is produced by placing the assembly parts 15 on the outside of the attachment regions 13 and connecting these elements in the appropriate regions, for example, by rivets, screws, welds, or the like. The slot, which is open towards the top, between the wall elements 3 is closed by means of a sealing plate 11, which is placed on the bent attachment regions 5. The sealing plate is connected to the retaining plate 9, for example, by screws or rivets, wherein the bent attachment regions 5 are fixed. Obviously, these regions of the retaining plate 9, the sealing plate 11, and the attachment regions 5 arranged in-between can also be connected in any other way representing an essentially pressure-tight connection. The feeding of a pressure medium into the space between the wall elements 3 can be realized, for example, by an opening not shown in more detail in the sealing plate 11 in the region of the central longitudinal slot 21 of the retaining plate 9.

The lateral sealing of the space that can be pressurized between the wall sections 3 can be realized by means of two lateral sealing elements 23. These are each held between an arm 25 extending upwards on the outside from the assembly parts 15 and also by means of a corresponding arm 27 extending upwards on the outside from the spacing and/or sealing element 19 between the side end surfaces of the wall sections 3 and the arms 25, 27. The sealing elements 23 can consist of a sufficiently flexible plastic or rubber or hard rubber. The sealing element can be pressed by means of the arms 25, 27 with sufficient pressure onto the side end surfaces of the wall sections 3, in order to guarantee a sufficiently pressure-tight seal.

At this point, it should be mentioned that the state of the clamping and/or braking device 1 shown in FIG. 1c can concern the pressurized state. In this state, the bending regions 3a of the wall sections 3 are shown outwardly convex relative to the space that can be pressurized between the wall sections 3. In the unpressurized state, the bending regions 3a of the device 1 from FIGS. 1a, 1b, and 1c can run, for example, essentially parallel and flat.

The bending regions 3a are shaped and dimensioned so that between the base element 7 and the force-applying element 17, the bending regions form a spring-like element, which is in the position to transfer sufficient pressurization force to an object to be clamped or braked even in the unpressurized state. For example, the wall sections can be made from a spring steel sheet, whose thickness can equal, for example, 0.5 mm.

In order to guarantee that the bending regions 3a are each bent outwardly convex when the force-applying element 17 is pressurized with a predetermined force in the unpressurized state, the bending regions 3a can also be slightly outwardly convex in the unpressurized state. This realizes a corresponding preference for the desired bending direction.

Obviously, however, it is also possible to think of the embodiment from FIG. 1c as a representation of the unpressurized state. By means of such an embodiment, which has a clear outwardly convex bend of the bending regions 3a even in the unpressurized state, it can also be achieved by means of pressurizing the pressure chamber with positive pressure that the distance between the force-applying element 17 and the base element 9 is reduced or that the forces transferred to the object to be pressurized are reduced for a device assembled with bias in the unpressurized state. In addition, it can be realized that for pressurization of the pressure chamber with negative pressure, the transferred forces are increased, because the bending regions 3a should be moved inwards for such a pressurization and consequently the distance between the force-applying element 17 and the base element 9 tends to increase.

The effect of the device 1 in FIGS. 1a, 1b, and 1c is shown in FIGS. 2a and 2b with the example of a linear guide 29. The linear guide 29 comprises a carriage 31, on which another arbitrary object can be arranged or which is connected to another arbitrary object. The carriage 31 is guided by means of roller bearings or ball bearings not shown in more detail on a rail 33. The device 1 from FIGS. 1a, 1b, and 1c is mounted underneath a carrier plate 35 of the carriage 31 and laterally next to the course of the rail 33. For this purpose, the retaining plate 9 can be connected to the bottom side of the carrier plate 35 in a way not shown in more detail, for example, it can be screwed.

It is assumed that the device 1 in FIG. 2b is in the pressurized state, consequently the bending regions 3a of the wall elements 3 are bent outwardly convex relative to the unpressurized state (with essentially parallel and flat pressure regions) and thus the force-applying element 17 has been raised from a force-applying surface 37 of an object 39, on which the rail 33 is mounted.

The functioning of such an embodiment of a clamping and/or braking device 1 in connection with a linear guide 29 is shown in cross section in FIGS. 3a and 3b again with reference to a slightly modified embodiment. For this linear guide 29, a clamping and/or braking device 1 is used in a slightly changed embodiment, in which the upper region or the base element 7 is also formed by two assembly parts 41, which are arranged on both sides of the upper attachment regions of the wall elements 3. As in the case of the force-applying element 17, in this case a spacing and/or sealing element 43 is also used between the upper attachment regions of the wall elements 3. The connection of the assembly parts 41, the upper attachment regions of the wall elements 3, and the spacing and/or sealing element 43 arranged in-between can be realized, in turn, by screws, rivets, welds, or the like. The base element 7 can then be connected to a longitudinal side of the carrier plate 35, for example, it can be screwed. The supply of compressed medium can be realized, for example, by one or more channels (not shown) in the base element 7. Parts of the channels can be provided in the assembly parts 41, the attachment regions of the wall elements 3, or the spacing and/or sealing element 43.

Figure 3A:
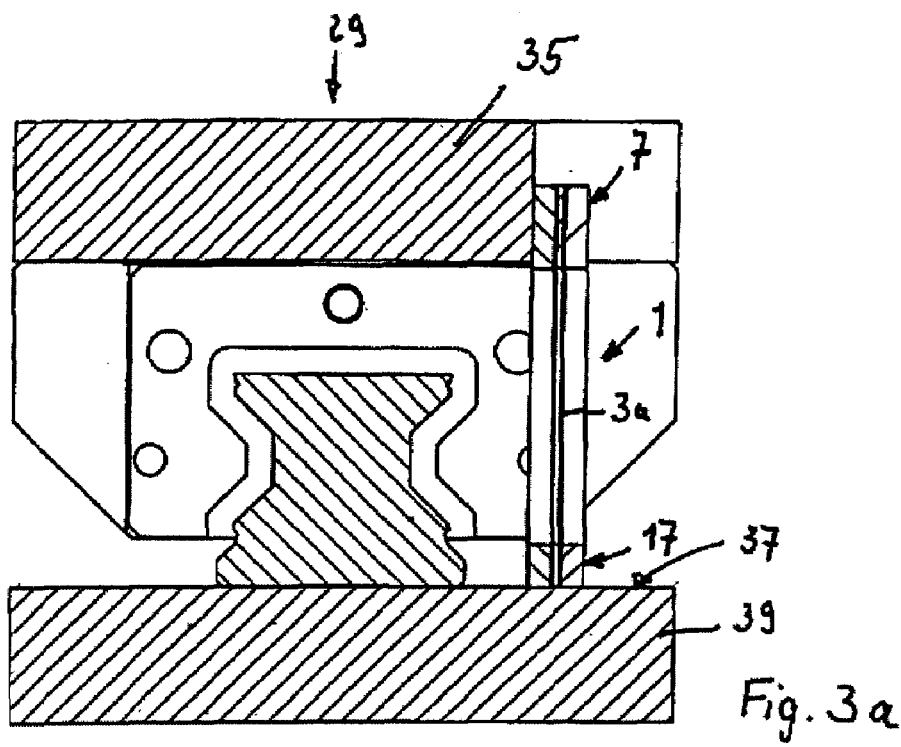
FIG. 3a is a view in transverse cross section through a linear guide similar to that shown in FIGS. 2a and 2b, but with a second embodiment of a clamping and/or braking device according to the invention arranged therein in the locked or braked state.
Figure 3B:
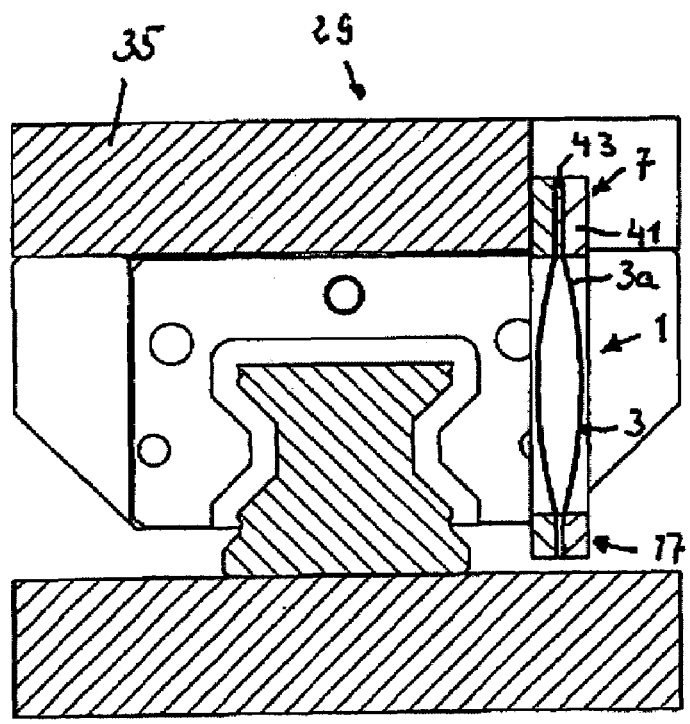
FIG. 3b is a view in transverse cross section similar to FIG. 3a, but showing the clamping and/or braking device in the released state.

FIG. 3a shows the unpressurized state of the device 1. In this state, the force-applying element 17 is pressed with a predetermined force against the force-applying surface 37 of the object 39. The slight curvature of the bending regions 3a of the wall elements 3 required by this biased assembly state is negligible in the representation in FIG. 3a. The biasing force can be determined, such that the force-applying element 17 is to be moved in the biased assembly state by a predetermined path relative to the released state in the direction towards the base element 7.

For pressurizing the pressure chamber between the wall elements 3 by supplying an arbitrary compressed medium, preferably compressed air, the bending regions 3a are bent outwardly convex and consequently the biasing force is reduced or the force-applying element 17 is ultimately completely lifted off the force-applying surface 37. In this way, the braking effect or clamping effect can be reduced or completely canceled.

The embodiment shown in FIGS. 4a and 4b of a clamping and/or braking device 1 essentially corresponds to the previously explained embodiments. In addition, the assembly parts 41, which are surrounded by the base element 7 or which form this element, have additional stops 45, which push back as adjacent elements with reference to the maximum curvature of the bending regions 3a of the wall elements 3. The stops 45 extend from the upper region of the assembly parts 41 outwards in the direction towards the force-applying element 17. The stops can obviously also extend in the cross section over the entire bending region 3a. The stops 45 guarantee that even if the permissible maximum pressure is exceeded when the pressure chamber formed between the wall elements 3 is pressurized, the walls are not destroyed or all persons or objects in the surroundings are not damaged in case of destruction.

Figure 5:
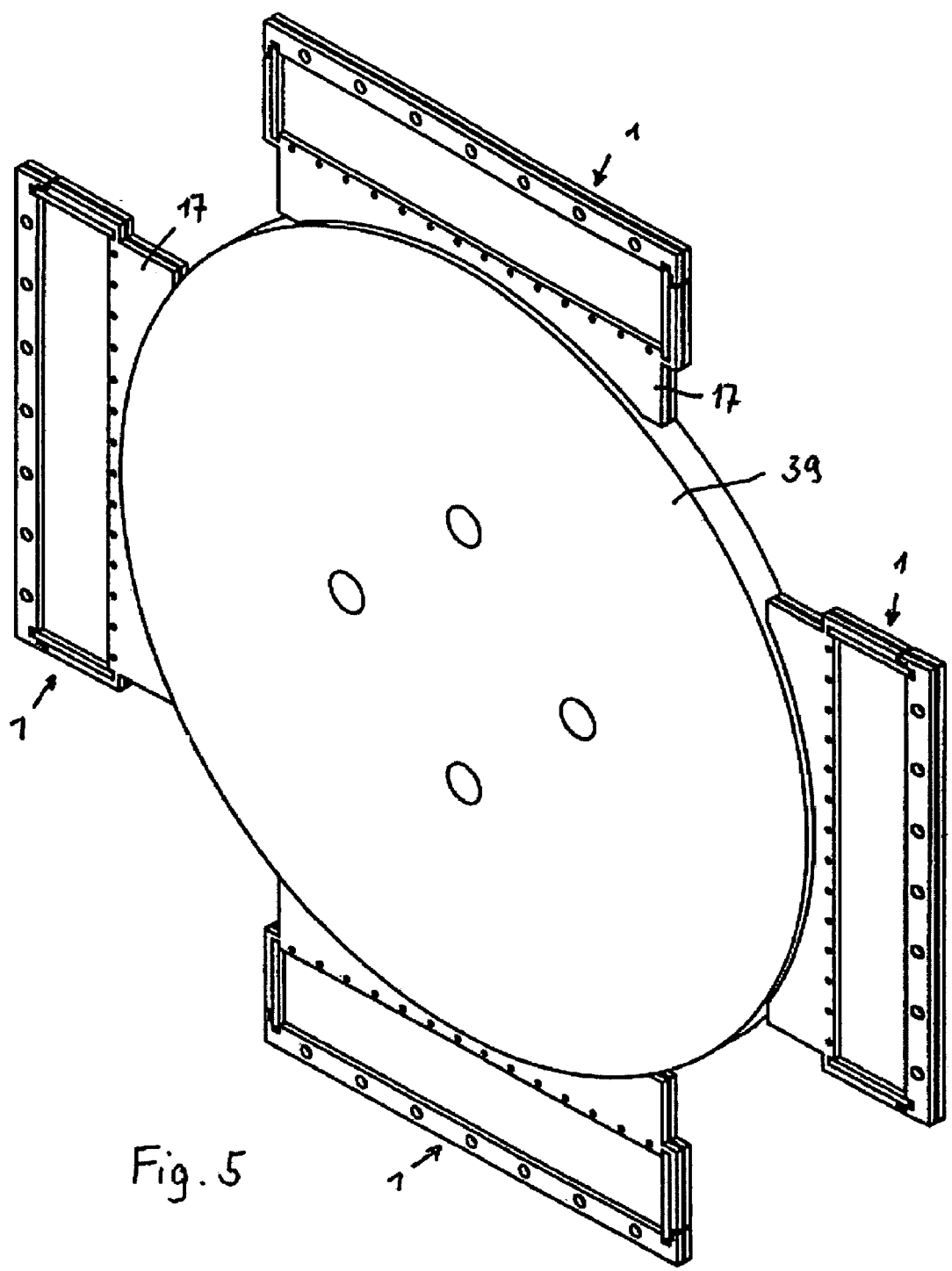
FIG. 5 is a perspective view of an arrangement of several clamping and/or braking devices similar to that shown in FIG. 3, the several devices positioned around the periphery of a disk-like clamping or braking element.

FIG. 5 shows an arrangement consisting of a force-applying, round cylindrical object 39, around whose peripheral surface clamping and/or braking devices 1 are arranged at equidistant distances 4. The individual devices 1 can be formed essentially as shown, for example, in FIG. 3a or 4a. The only difference is that the force-applying element 17 is shaped on the force-applying surface so that the force-applying surface of the force-applying elements 17 has a radius, which corresponds to the radius of the round cylindrical object 39 to be pressurized.

At this point it should be mentioned again that, for the sake of clarity, in all of the previously described embodiments of clamping and/or braking devices 1, the force-applying element and the base element are each connected exclusively via the wall elements 3. The side arms 25 or 27 of the assembly parts 15 or the spacing and/or sealing elements 19 are used merely for fixing the side sealing element 23. In the same way, (as shown in FIGS. 4a and 4b) correspondingly short retaining arms can extend from the assembly parts 15 in the direction towards the force-applying element 17. However, this is also used merely for holding the side sealing elements 23. Between the end sides of the arms 25, 27 under the corresponding (short) arms of the assembly parts 15 or the spacing and/or sealing element 43 arranged in-between, there remains a gap, which enables a correspondingly free movement of the force-applying element 17 relative to the base element 7.

Figure 6B:
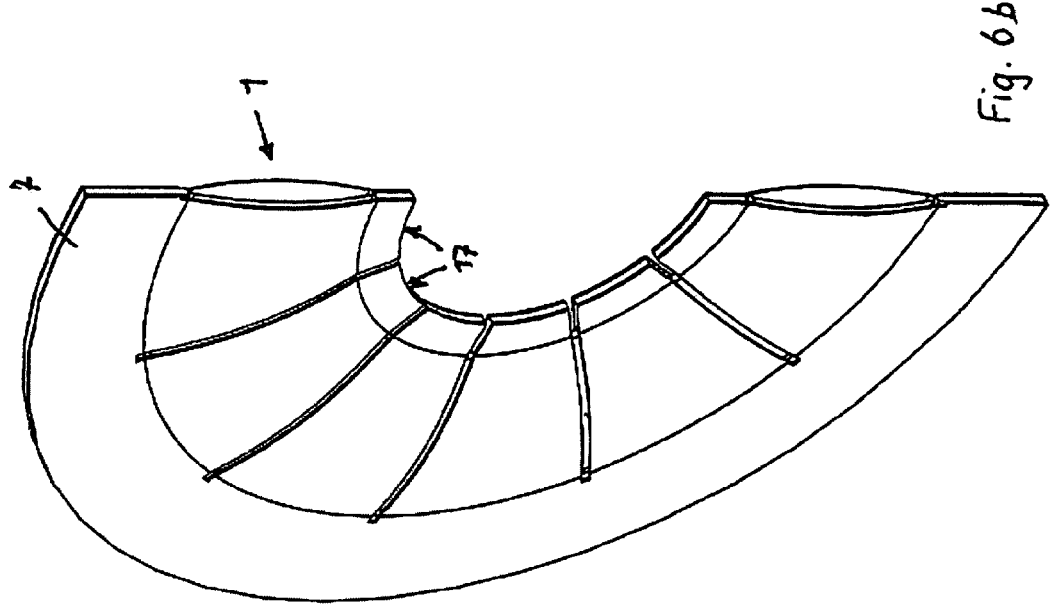
FIG. 6b is a perspective partial view of the device shown in FIG. 6a, but with the device in the completely assembled state wherein a tubular ring-shaped sealing element is provided for forming the space that can be pressurized.
Figure 6A:
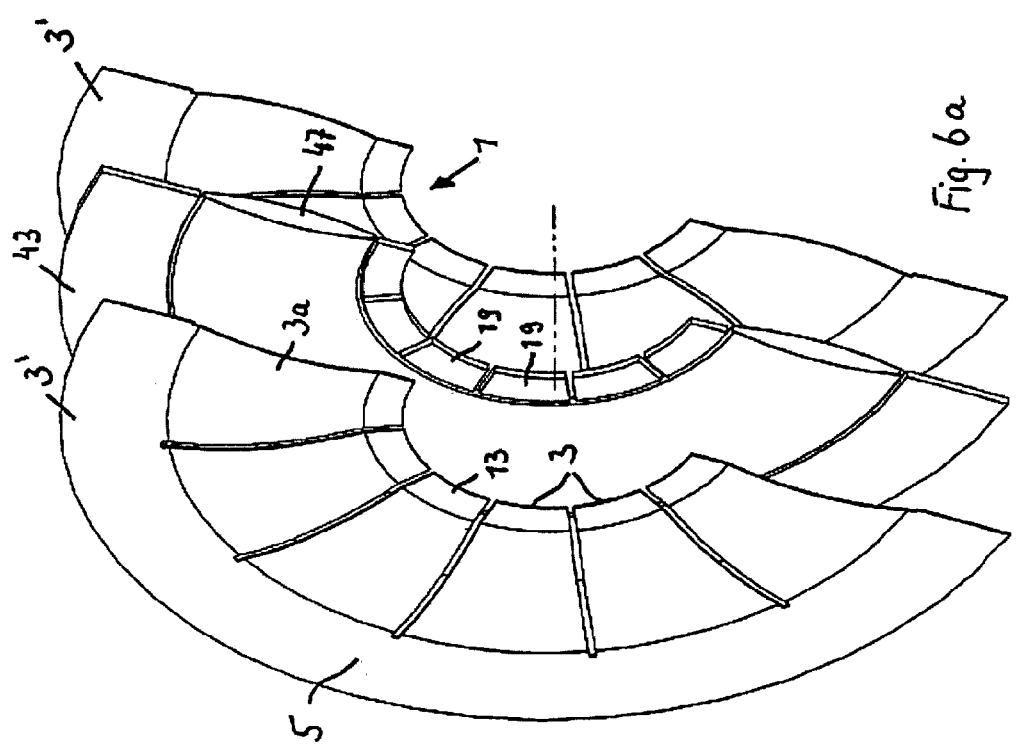
FIG. 6a is a perspective partial view of a ring-shaped clamping and/or braking device according to the invention with several force-applying elements for applying force to a cross-sectionally round cylindrical object.

The clamping and/or braking device 1 from FIGS. 6a and 6b has a ring shape (FIGS. 6a and 6b show only a partial half ring), wherein the device 1 consists of two radially slotted, ring-shaped wall elements 3', between which in the region of the inner attachment regions 13 of the individual walls, a spacing and/or sealing element 19 is arranged and in the region of the ring-shaped attachment region 5, a ring-shaped spacing and/or sealing element 43 is arranged. For assembly, the wall elements 3' are connected tightly in the attachment regions 5 and 13 to the spacing and/or sealing elements 43 or 19 arranged in-between. The connection can be realized, for example, by screws, rivets, welds, or the like. In this way, the clamping and/or braking device 1 shown in FIG. 6b, which overall has a ring shape, is produced. Projecting from the ring-shaped base element 7, several pairs of wall sections 3 extend radially inwards, which are separated from each other by a radial slot. These wall pairs are each connected to a force-applying element 17 and define on the inner end side peripheral sections of a round cylindrical opening, in which a round cylindrical element can be pressurized. Here, it can concern a rotating shaft of a drive or the like. The function of this device corresponds analogously to the function as was explained previously in connection with the embodiments in FIGS. 1a to 5.

The embodiment from FIGS. 6a and 6b can be shaped so that a sealed pressure chamber is defined between each wall pair. For this purpose, a sealing element, which can be, for example, adhered, is held in the parts of the wall sections adjacent to the radial slots. However, a separate control of the individual force-applying elements 17 is not necessary in this embodiment. For this reason, it presents itself to connect all of the pressure chambers, which are defined by the pairs of wall sections, to each other into a common pressure chamber.

For this purpose, for the embodiment shown in FIGS. 6a and 6b, a ring-shaped tube element 47 is inserted between the bending regions 3a of the wall elements 3.

In a way not shown in more detail, the compressed medium can be fed to this tube element 47. In this way, when pressurized, all of the pairs of wall sections are pressurized uniformly and the concerned bending regions 3a are bent outwards for pressurization with positive pressure. Here, it should be assumed, in turn, that the state of the clamping and/or braking device 1 shown in FIG. 6b is the pressurized state.

In this configuration, the bending regions 3a run essentially parallel in the unpressurized state (apart from the slight convex formation discussed above for defining a preferred direction of bending when the force-applying elements 17 are pressurized in the unpressurized state).

However, the device 1 shown in FIG. 6b can also be a device in the unpressurized state. This device can then also be used so that when the pressure chamber is pressurized with negative pressure, the individual force-applying elements 17 move inwards. For this purpose, however, the wall sections of the tubular ring 47 must be connected in the attachment regions 3a so tightly to the inner wall sections of the wall elements 3' that corresponding inwardly directed forces can be transferred to the bending regions. According to a different embodiment not shown in more detail, however, lateral sealing elements, which seal the individual pressure chambers between the individual bending regions 3a, can be held in the radial slots.

Figure 7B:
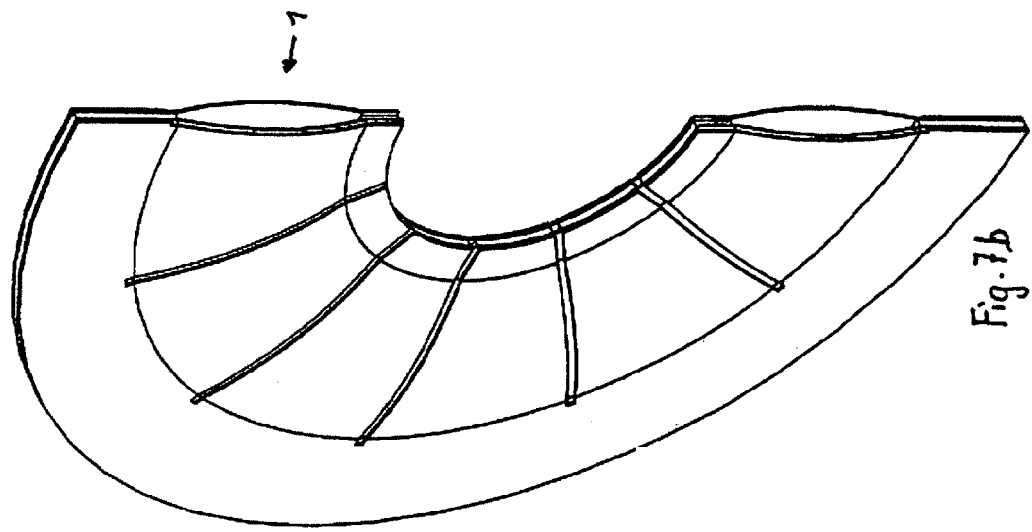
FIG. 7b is a perspective partial view of the embodiment shown in FIG. 7a, but with the device in a completely assembled state.
Figure 7A:
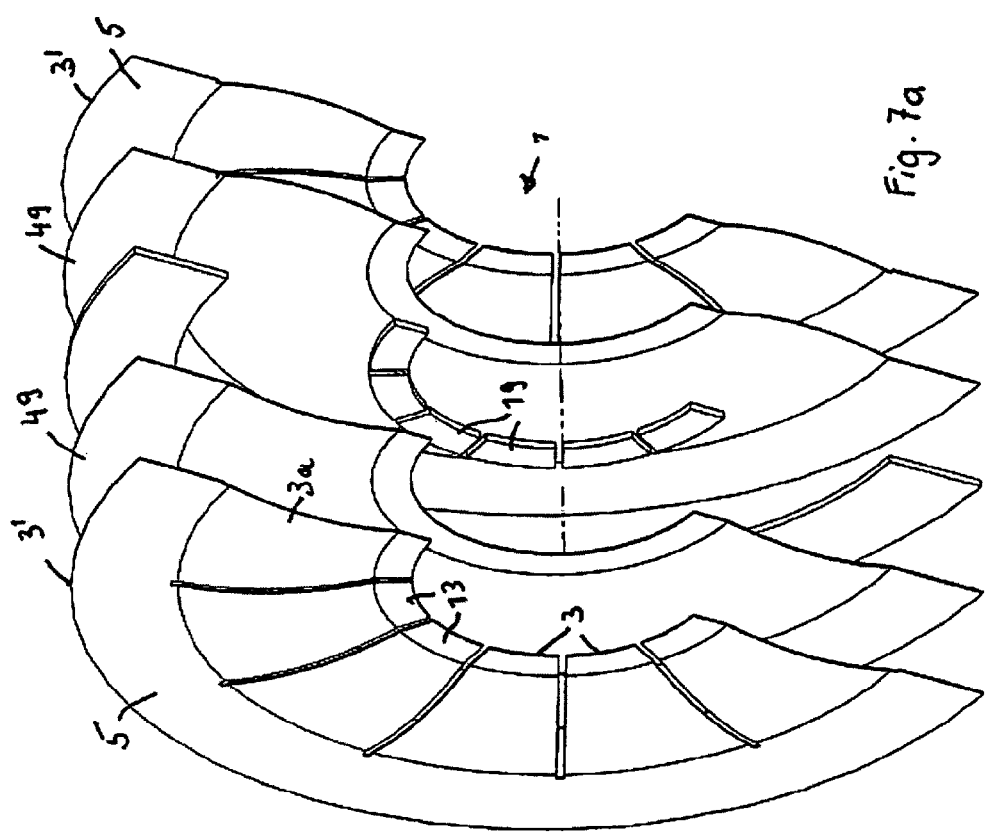
FIG. 7a is a perspective partial view of another embodiment of the invention similar to that shown in FIGS. 6a and 6b, wherein the space that can be pressurized is formed by means of two circular ring-shaped sealing elements.

The embodiment of a clamping and/or braking device from FIGS. 7a and 7b corresponds to a large extent to the embodiment shown in FIGS. 6a and 6b, but in this embodiment, two circular ring-shaped sealing elements 49 are held between the circular ring-shaped, radial, slotted wall elements 3'. The sealing elements 49 are fixed in the outer ring-shaped region of the attachment regions 5 of the wall elements 3' and in the inner attachment regions 13 of the individual wall sections 3.

Figure 8A:
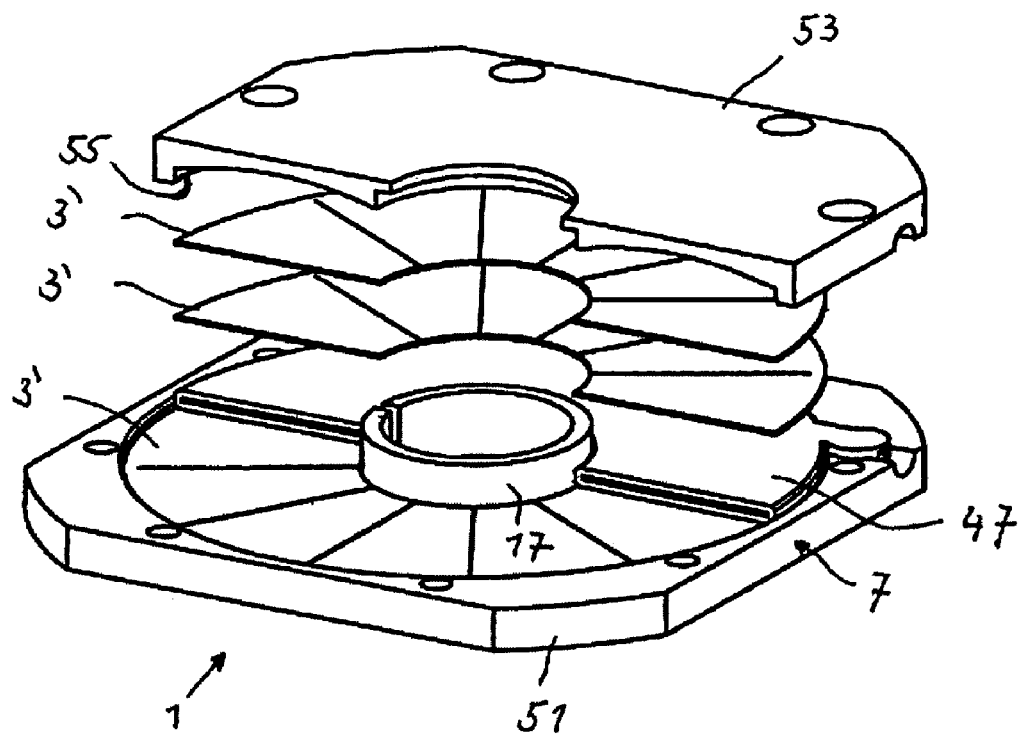
FIG. 8a is an exploded perspective view of a ring-shaped clamping and/or braking device similar to that shown in FIGS. 6a and 6b, but with a slotted force-applying element for applying force to a cross-sectionally round cylindrical object.
Figure 8B:
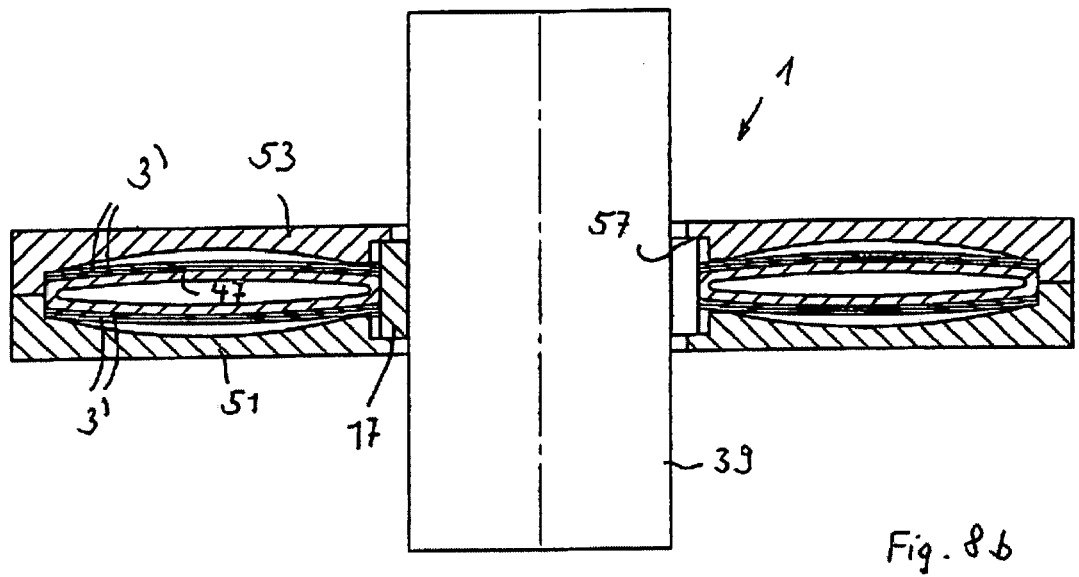
FIG. 8b is a view in transverse cross section through the fully assembled device shown in FIG. 8a, with the clamping and/or braking device in the unpressurized state.
Figure 8C:
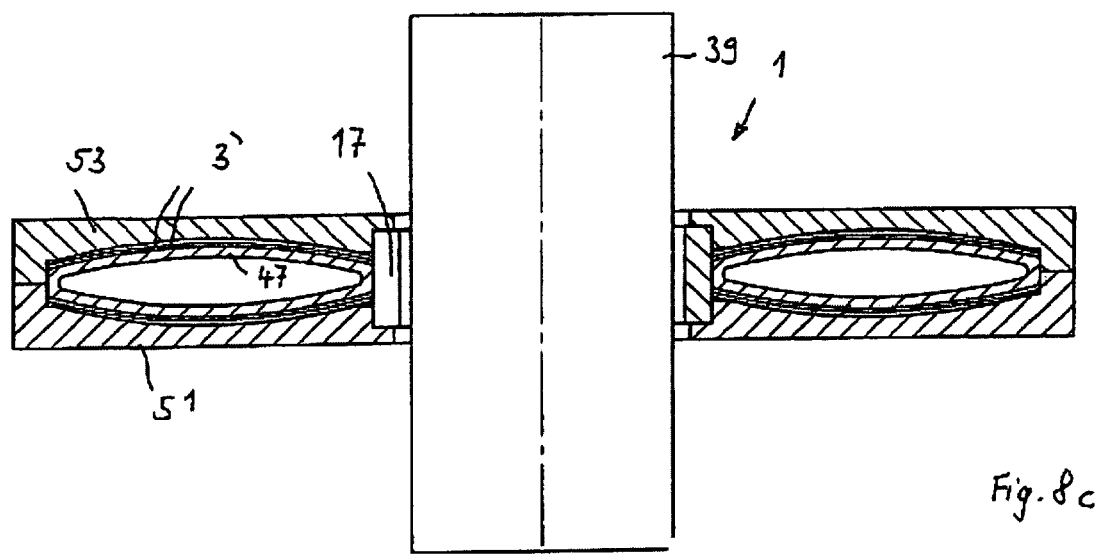
FIG. 8c is a view in transverse section similar to FIG. 8b, but with the clamping and/or braking device in the pressurized state.

FIGS. 8a, 8b, and 8c show another embodiment of a clamping and/or braking device 1, which is suitable for the clamping or braking of a not-shown, cross-sectionally circular element, for example, a bar that can move in the axial direction or a shaft that can rotate. Obviously, this embodiment can also be modified so that elements can be clamped or braked with other cross sections.

As can be seen from the perspective, exploded view in FIG. 8a, the device 1 comprises a base element 7, which is formed as a housing. The base element 7 can have a means for attaching the device to another element.

As shown in FIG. 8a, the housing preferably has two housing half-sections, which each receive two radial slotted wall elements 3', similar to the embodiments in FIGS. 6b and 7b, in their interior on both sides of a ring-shaped tube element 47. However, these wall elements 3' are not connected rigidly to each other, but instead are supported with their outer periphery on the peripheral wall section 55 of the housing half-sections 51, 53 and with their inner periphery or with the radially inwards directed end surfaces of the individual wall sections 3, which are separated by the slots from each other, on the outer periphery of a force-applying element 17, which is elastic in the radial direction. To achieve the elastic property, the ring-shaped force-applying element 17 preferably has a slotted form, so that a change of the inner diameter or the inner geometrical dimensions is possible with lower forces than for a ring-shaped, closed force-applying element. The wall elements 3' are dimensioned so that they already exert a predetermined pressure force on the tube element 47 in the original state, i.e., in the unpressurized state of the ring-shaped tube element 47 without an object to be clamped or braked inserted in the device, and press this tube element together. When the tube element 47 is pressurized with positive pressure, the wall elements 3' are each bent outwards and assume the maximum end position shown in FIG. 8c. The end position is defined by the inner wall section of the corresponding housing half-sections 51, 53. The wall sections of the housing half-sections 51, 53 are used simultaneously as protection for the surroundings or for preventing destruction of the device even if the permissible pressure, which is necessary for reaching the end position, is exceeded. When the tube element 47 is pressurized, the tube element 47 expands in the radial direction due to the decreasing forces, which are exerted by the wall elements 3' in the unpressurized state on the force-applying element 17. The wall elements 3' and the force-applying element 17 must be dimensioned with regard to their geometrical dimensions and their material properties so that a sufficient, predetermined spring path of the force-applying element 17 is produced, if a complete release of the object 39 is desired or a sufficient predetermined reduction of the clamping or braking force exerted on the object 39. As shown in FIGS. 8b and 8c, the force-applying element 17 can be guided in a ring-shaped groove-like recess 57 in the interior periphery of the housing half-sections 51, 53 with reference to its radial spring path.

Through the use of two wall elements 3' on both sides of the tube element 47, in the original state there is a higher clamping or braking force than with the use of a single wall element on both sides of the tube element. Obviously, however, an arbitrary number of wall elements 3 can be provided on both sides of the tube element 47.

Obviously, the feature of an elastic, ring-shaped force-applying element, which preferably has a slotted form, can also be combined with features of the preceding embodiments, especially according to FIGS. 6b and 7b.

Figure 9A:
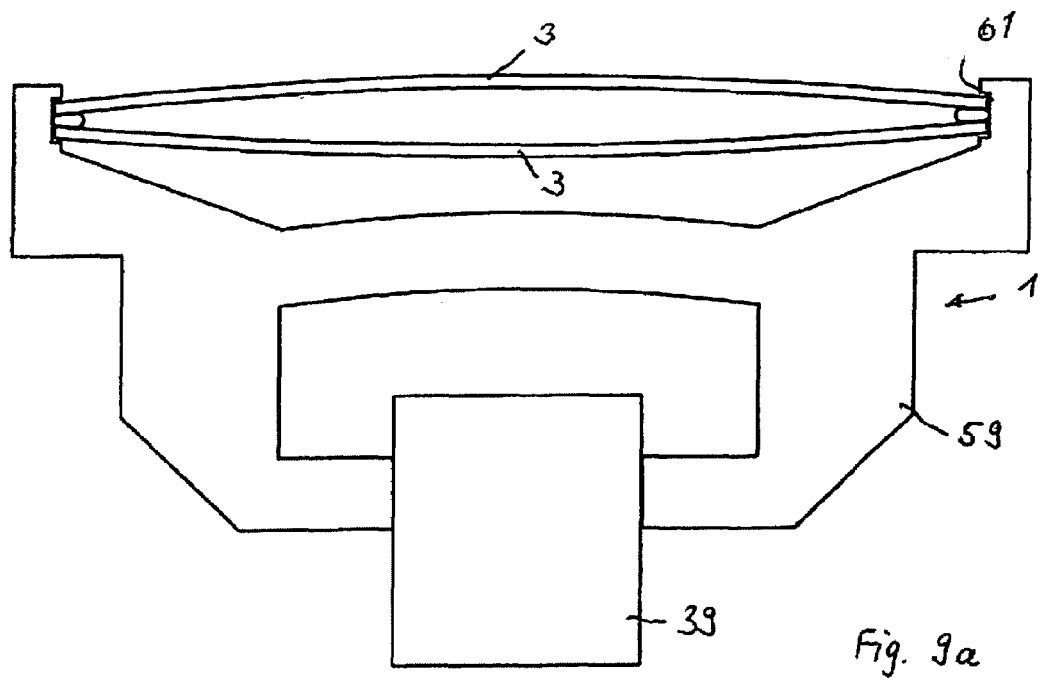
FIG. 9a is a view in transverse cross section of an embodiment of the invention with a cross-sectionally H-shaped force-applying element, which receives force from two parallel wall sections, which limit a pressurization chamber, the device being in the unpressurized (biased) state.
Figure 9B:
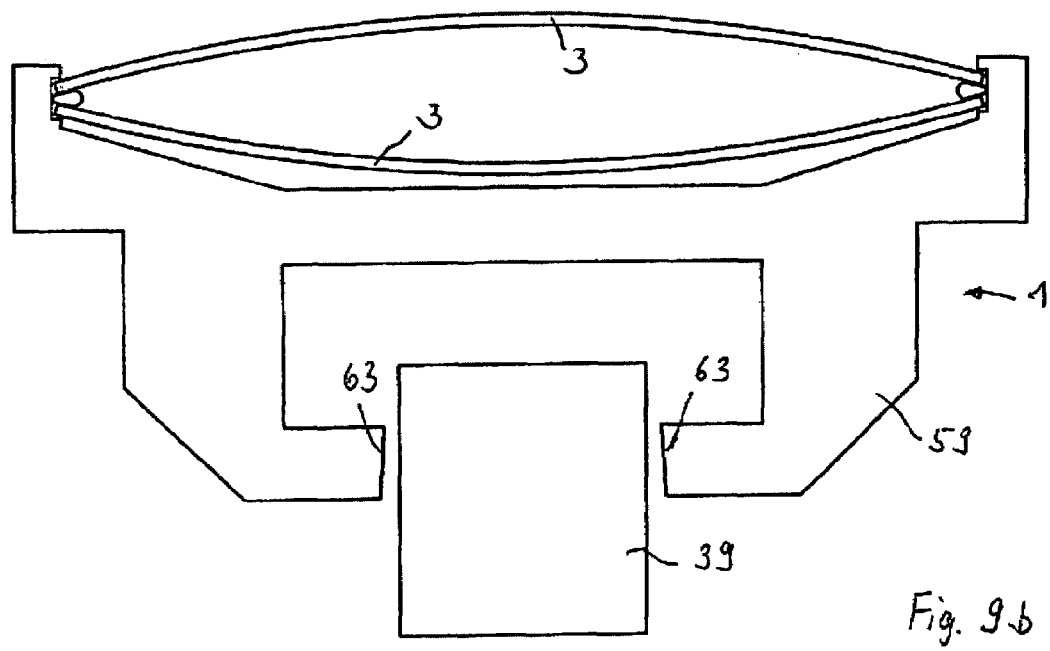
FIG. 9b is a view in transverse cross section similar to FIG. 9a, but with the device in a pressurized (released) state.

FIGS. 9a and 9b show another embodiment of a clamping and/or braking device 1 for clamping a linear object 39, for example, a rail, which comprises a cross-sectionally H-shaped base 59, similar to FIG. 1 of WO 01/34990 A1 by the applicant, wherein, however, the two wall sections are not connected in one piece to the upper limbs of the base 59, but instead contact and apply force to these limbs. As shown in FIG. 9a, the wall sections can be held in a longitudinal groove 61 in the inner sides of the limb of the base 59. A spacing and/or sealing element 43, which laterally seals the longitudinal sides of the wall sections 3, is provided between the lateral end regions of the wall sections 3. The spacing and/or sealing element 43 can be produced separated and placed during assembly of the device 1 between the wall sections 3 or, e.g., it can be produced through the injection of a sealing mass between the wall sections 3 or into the longitudinal groove 61. Other, not shown sealing elements are provided at the end sides of the wall sections, for example, similar to the sealing elements 23 of the embodiment shown in FIG. 1a.

The base 59 is designed with reference to the object to be clamped or braked so that the clamping and/or braking regions of the H-shaped base completely release the object 39 or exert necessary minimal force on the object when the space between the wall sections is pressurized with a maximum permissible working pressure. In the unpressurized state of the sealed space between the wall sections 3, the wall sections exert such a force on the limbs of the base that the upper limbs are bent flexibly and reversibly outwards and thus the lower limbs and the clamping and/or braking regions are bent inwards. In this way, in the unpressurized state, a predetermined force is exerted on the object 39 by the correspondingly stiff wall sections 3 on the upper limbs of the base 59 and thus by the clamping and/or braking regions of the lower limbs of the base. Here, in a hinge region, which is located in the shown example in the region of the transition of the horizontal wall section into the vertical limbs of the base, the base can be bent elastically and reversibly accordingly. Through a corresponding dimensioning of the limbs of the base, a lever ratio can be set, which realizes a step up or down of the forces exerted on the upper limbs.

In the nomenclature of the previously described embodiments, the base 59 can also be designated as force-applying element 17, which is integrated with the base element 7, wherein, in addition, a mechanical lever step up or down can be integrated.

However, the force-applying elements of the embodiments from FIGS. 8a and 9a are elastic relative to the force-applying elements from FIGS. 1a to 7b, wherein in the reduced-pressure or unpressurized state, the clamping or braking forces on the object are reduced or the object is released, such that forces which counteract the forces exerted by the wall sections on the force-applying element are generated by the elastic force-applying element. This applies at least for the case in which when the space between the wall sections or wall elements is pressurized sufficiently that these can be bent so wide that the object is completely released (in this case the object would move freely at least for a complete cancellation of the forces, which are exerted by the wall sections on the force-applying element).

However, it is also possible for the force-applying element to be formed with reference to the object to be clamped or braked, so that without the exertion of forces by the wall sections or wall elements, forces can already be transferred to the object (in this case, the force-applying element is already deformed elastically by the object, even if no forces in the sense of clamping or braking are exerted by the wall sections on the force-applying element). In the unpressurized state, additional forces are then exerted by the wall sections or wall elements onto the force-applying element in the sense of clamping or braking and these forces can be completely or partially canceled when pressurized.

Obviously, a plurality of other forms of bases is also conceivable. For example, a cross-sectionally U-shaped base can be used, wherein the two wall sections are provided between the limbs of the U. The limbs of the U then bend elastically inwards when the intermediate space between the wall sections is pressurized. If the clamping and/or braking regions are also located between the limbs of the U, then in this embodiment, a (increased) clamping or braking effect is achieved when pressurized. If the clamping and/or braking regions are located outside the limbs of the U, then the forces transferred to the object are reduced or completely canceled when pressurized.

In conclusion, it should be mentioned that all of the features, which are explained in more detail above in connection with individually determined embodiments, can also be used with other embodiments as far as this is useful. For example, the embodiments from FIGS. 6b and 7b obviously can also have corresponding stops for limiting the bending movements of the bending regions 3a in the individual wall sections 3.

The above described preferred embodiments are intended to illustrate the principles of the invention, but not to limit the scope of the invention. Various other embodiments and modifications to these preferred embodiments may be made by those skilled in the art without departing from the scope of the invention.

The invention claimed is:

1. A clamping and/or braking device including:
   (a) a base element, which is connected rigidly by means of two adjacent wall sections to a force-applying element, by means of which the generated clamping and/or braking forces can be transferred to an object,
   (b) wherein the two adjacent wall sections define an essentially sealed pressure chamber that can be pressurized with positive pressure or negative pressure,
   (c) wherein the two wall sections each have a bending region, which is resistant to tensile force and nevertheless can be bent elastically so that the bending regions form an elastic element between the base element and the force-applying element,
   (d) wherein in the unpressurized built-in state of the clamping and/or braking device, the two wall sections exert a predetermined clamping and/or braking force on the object by means of the force-applying element,
   (e) wherein the two wall sections and their bending regions are shaped and dimensioned so that from an initial position of the pressure chamber a first pressure applied in the pressure chamber results in an increase in the curvature of the bending regions and reduces the clamping and/or braking forces transferred by the force-applying element to the object, or so that from the initial position of the pressure chamber a second pressure applied in the pressure chamber results in a decrease in the curvature of the bending regions and increase the clamping and/or braking forces transferred by the force-applying element to the object, and wherein the second pressure is opposite to the first pressure, and (f) wherein the two wall sections are formed by two wall elements, each wall element formed as a ring-shaped, radially slotted plate, and wherein the bending regions are formed at least in the wall element regions between the slots.

2. The device of claim 1 wherein the base element is formed as a ring shape.

3. The device of claim 1 wherein the force-applying elements is arranged within the base element and defines a circular ring-shaped clamping region.

4. The device of claim 1 wherein the force-applying element is arranged within the base element and is formed as a slotted ring.

5. The device of claim 1 wherein the pairs of wall sections each lie in a plane and are closely adjacent.

6. The device of claim 1 wherein an attachment region, which is connected to the corresponding force-applying element or which forms the corresponding force-applying element, is provided on each end region of the wall sections, and wherein a joining region of the wall elements forms another attachments region, which is connected to the base element of forms the base element.

7. The device of claim 1 wherein two ring-shaped sealing elements, which form a common pressure chamber for the two of wall sections, are provided between the wall elements, wherein the ring-shaped sealing elements are held preferably in a sealed manner between attachment regions of the wall elements.

8. The device of claim 1 wherein a tubular ring element, which forms a common pressure chamber for the two of wall sections, is provided between the bending regions of the wall elements.

9. The device of claims 1 wherein at least one wall element is made from a stack of several partial wall elements.

10. The device of claim 1 wherein the base element is formed as an essentially closed, two-part housing, in which the wall elements are received, wherein inner wall sections of the housing limit a maximum bending of the bending regions of the wall sections.

11. The device of claim 10 wherein the force-applying element is ring-shaped and is also held in the housing.

12. The device of claim 1 wherein at least one additional force-applying element is connected to the base element by two additional wall sections formed by the two wall elements.

13. A clamping and/or braking device including:

(a) a base element and a force-applying element, by means of which the generated clamping and/or braking forces can be transferred to an object, as well as two adjacent wall sections, which each apply force with an end region onto the base element and the force-applying element, (b) wherein the two or more adjacent wall sections define an essentially sealed pressure chamber that can be pressurized with pressure or negative pressure, (c) wherein the two wall sections each have a bending region, which is resistant to tensile force and nevertheless can be bent elastically so that the bending regions form an elastic element between the base element and the force-applying element, and (d) in the unpressurized built-in state of the clamping and/or braking device, the two wall sections exert a predetermined clamping and/or braking force on the object by means of the force-applying element, (e) wherein the two or more wall sections and their bending regions are shaped and dimensioned, so that from an initial position of the pressure chamber a first pressure applied in the pressure chamber results in an increase in the curvature of the bending regions and reduces the clamping and/or braking forces transferred by the force-applying element to the object, or so that from the initial position of the pressure chamber a second pressure applied in the pressure chamber results in a decrease in the curvature of the bending regions and increases the clamping and/or braking forces transferred by the force-applying element to the object and wherein the second pressure is opposite to the first pressure, and (f) wherein the two wall sections are formed by two wall elements, each wall element comprising a ring-shaped, radially slotted plate, and wherein the bending regions are formed at least in the wall element regions between the slots.

14. The device of claim 13 wherein at least one additional force-applying element is acted upon by two additional wall sections to transfer clamping and/or braking forces to the object, the two additional wall sections being formed by the two wall elements.

* * * * *

UNITED STATES PATENT AND TRADEMARK OFFICE
CERTIFICATE OF CORRECTION

PATENT NO. : 7,392,886 B2 Page 1 of 1
APPLICATION NO. : 10/542812
DATED : July 1, 2008
INVENTOR(S) : Klaus Hofmann It is certified that error appears in the above-identified patent and that said Letters Patent is hereby corrected as shown below:

At column 15, lines 16-17:
 change "elements is" to --element is--.

At column 15, line 33:
 change "two of wall" to --two wall--.

At column 15, line 38:
 change "two of wall" to --two wall--.

At column 15, line 41:
 change "claims 1" to --claim 1--.

At column 16, line 12:
 change "two or more adjacent walls" to --two adjacent walls--.

At column 16, line 24:
 change "wherein the two or more wall sections" to --wherein the two wall sections--.

Signed and Sealed this

Sixteenth Day of September, 2008

JON W. DUDAS
*Director of the United States Patent and Trademark Office*